US012585517B2

(12) United States Patent
Pande et al.

(10) Patent No.: US 12,585,517 B2
(45) Date of Patent: Mar. 24, 2026

(54) DCF-ASSISTED EARLY WARNING SYSTEM FOR EDGE DEVICES

(71) Applicant: Dell Products L.P., Round Rock, TX (US)

(72) Inventors: Pankaj Pande, Carlingford (AU); Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 48 days.

(21) Appl. No.: 18/750,507

(22) Filed: Jun. 21, 2024

(65) Prior Publication Data

US 2025/0390367 A1    Dec. 25, 2025

(51) Int. Cl.
*G06F 11/07* (2006.01)
*G06F 21/62* (2013.01)

(52) U.S. Cl.
CPC ...... *G06F 11/0748* (2013.01); *G06F 11/0793* (2013.01); *G06F 21/62* (2013.01)

(58) Field of Classification Search
CPC ............... G06F 11/004; G06F 11/0754; G06F 11/0793; G06F 11/2294; G06F 21/50; G06F 21/57; G06F 21/577
See application file for complete search history.

(56) References Cited

U.S. PATENT DOCUMENTS

| | | | | |
|---|---|---|---|---|
| 11,716,265 B2 * | 8/2023 | Nazar | ................. | H04L 43/0823 709/224 |
| 2009/0328148 A1 * | 12/2009 | Lee | ......................... | H04L 63/12 708/446 |
| 2023/0102852 A1 * | 3/2023 | Andrae | ................. | G06F 9/5072 370/331 |
| 2023/0135645 A1 * | 5/2023 | Guim Bernat | ...... | G06F 11/0709 718/105 |
| 2023/0289604 A1 * | 9/2023 | Chan | ...................... | G06F 21/577 |
| 2024/0126889 A1 * | 4/2024 | Clark | ..................... | G06F 21/577 |
| 2024/0185191 A1 * | 6/2024 | Bernardi | ................... | H04L 9/50 |
| 2024/0305533 A1 * | 9/2024 | Bai | ........................ | H04W 24/02 |
| 2025/0039134 A1 * | 1/2025 | Roquemore | ........ | H04L 63/0435 |

FOREIGN PATENT DOCUMENTS

| | | | | |
|---|---|---|---|---|
| CN | 110572796 A | * | 12/2019 | ............. H04W 4/44 |

* cited by examiner

*Primary Examiner* — Gabriel Chu
(74) *Attorney, Agent, or Firm* — Workman Nydegger

(57) ABSTRACT

One example method includes monitoring confidence scores received from an edge entity in an edge environment, and the edge entity comprises hardware and/or software, comparing a change in the confidence scores with a threshold permissible confidence score change, when a magnitude of the change is above a threshold permissible change, identifying the edge entity, or a system/device monitored by the edge entity, as a possibly malfunctioning entity, identifying a corrective action for the edge entity, and implementing, and/or causing implementation of, the corrective action.

18 Claims, 4 Drawing Sheets

DCF-ASSISTED EARLY WARNING SYSTEM FOR EDGE DEVICES

TECHNOLOGICAL FIELD OF THE DISCLOSURE

Embodiments disclosed herein generally relate to monitoring and maintenance of systems and devices in edge environments. More particularly, at least some embodiments relate to systems, hardware, software, computer-readable media, and methods, for using DCF (data confidence fabric) confidence scores as a basis for identifying, and resolving, problems in edge devices.

BACKGROUND

Detecting potential hardware or software failures in edge devices before they affect operations is important for maintaining system stability and performance. However, conventional early warning systems may not be sensitive or robust enough to confidently predict failures. For example, there may not be adequate types, or amounts, of data available, or used, that could identify potential failures.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

DETAILED DESCRIPTION OF SOME EXAMPLE EMBODIMENTS

Figure 1:
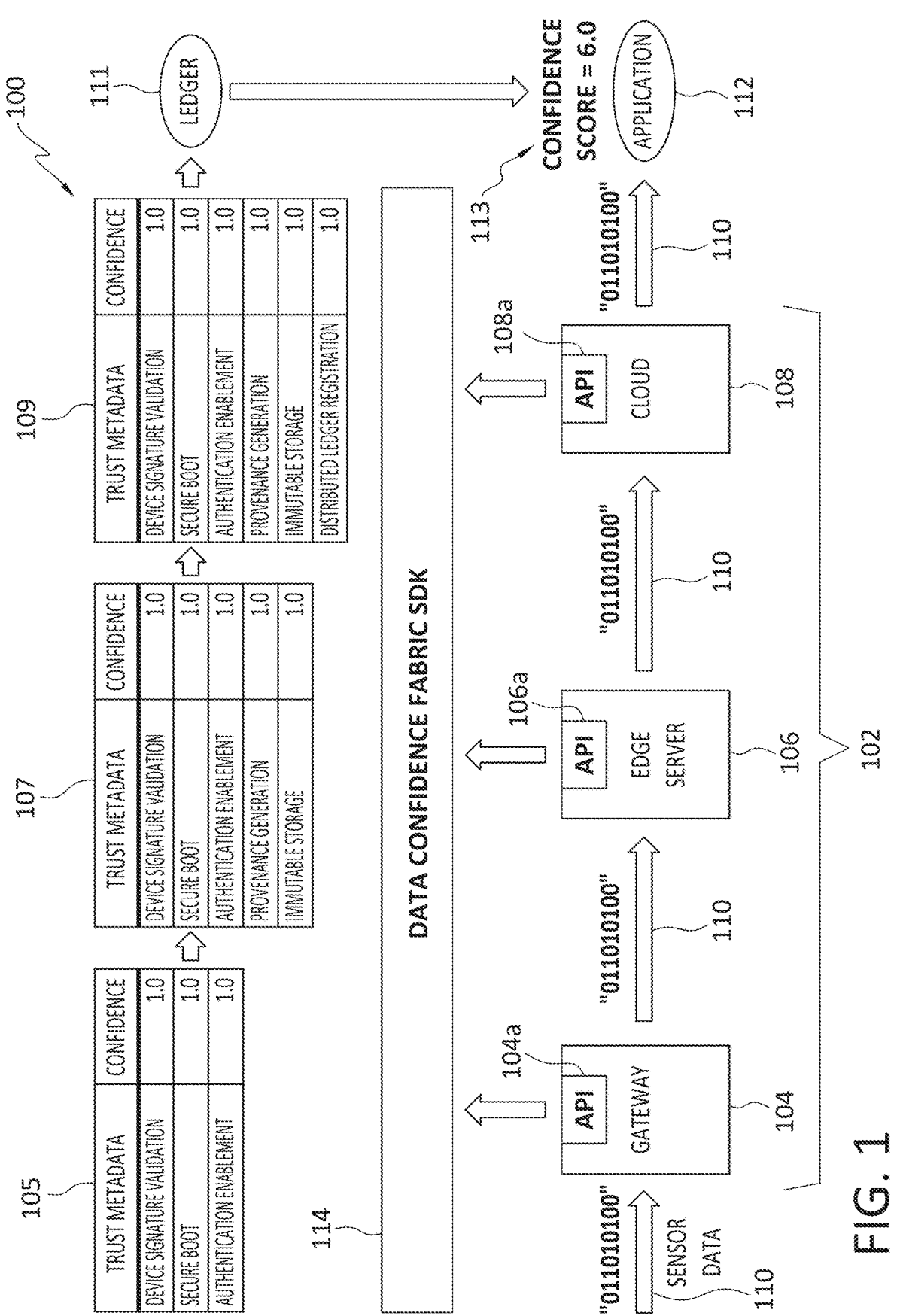
FIG. 1 discloses aspects of a DCF (data confidence fabric) in connection with which an embodiment may implemented.

Embodiments disclosed herein generally relate to monitoring and maintenance of systems and devices in edge environments. More particularly, at least some embodiments relate to systems, hardware, software, computer-readable media, and methods, for using DCF (data confidence fabric) confidence scores as a basis for identifying, and resolving, problems in edge devices.

One example embodiment comprises a method for collecting and monitoring confidence scores, such as may be assigned by a DCF-enabled edge environment, pertaining to various devices in the edge environment. Changes in the DCF scores that exceed established thresholds may be indicative of an actual, or potential, problem with the edge device(s) in which those confidence score changes were observed, and/or a potential problem in a system or device monitored by an edge device. One example of such a method may comprise the following operations: monitoring confidence scores for an edge device of an edge environment; comparing any changes in the confidence scores with a threshold confidence score change value; when a change in one of the confidence scores is above the threshold confidence score change value, identifying the edge device, or a system/device monitored by the edge device, as a possibly malfunctioning device; and, performing a corrective action concerning the edge device or system/device monitored by the edge device.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of one embodiment is that confidence scores may be used to identify potential edge device malfunctions. An embodiment may enable avoidance of a problem expected to result from a device malfunction. An embodiment may enable implementation of a corrective action in an edge device before a malfunction occurs with respect to that edge device. An embodiment may help to maintain the reliability and uptime of an edge device and edge environment. Various other advantages of one or more example embodiments will be apparent from this disclosure.

A. Aspects of an Example DCF (Data Confidence Fabric)

The following is a discussion of aspects of an example DCF in connection with which an embodiment may be implemented. This discussion is not intended to limit the scope of the disclosure or claims, or the applicability of the embodiments, in any way.

In general, embodiments may be implemented in connection with systems, software, and components, that individually and/or collectively form computing environments, such as edge computing environments for example. One or more embodiments may be employed in computing environments that comprise, or implement, a portion of a data confidence fabric (DCF).

Note that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

In general, a DCF may include various nodes, which may comprise hardware and/or software, through which the data passes as the data moves through the DCF. In an embodiment, one or more of the nodes may comprise a respective edge entity that may comprise hardware and/or software. Trust information, and confidence information such as data confidence scores, or simply 'confidence scores,' concerning the data may be inserted at one or more of these nodes as the data transits the DCF. The trust information may indicate, for example, a relative extent to which the data may be considered trustworthy by a user of the data, such as an application for example. The confidence information may indicate a relative level of confidence in the trustworthiness of the data.

Thus, if data passes through a node that is considered untrustworthy, or at least not fully trustworthy, for some reason, the confidence in the integrity and reliability of that data may be relatively low. That is, the trust information may be a function of, for example, the nature and operation of the node(s) through which the data passes. To illustrate, if a node that handles the data is determined to have inadequate security controls, data that has passed through that node may be assessed as relatively untrustworthy and the confidence in that data may be correspondingly low. Thus, an application that may have a need for the data may consider the confidence level, or confidence score, of the data in determining whether or not to use that data.

Turning now to FIG. 1, details are provided concerning an example DCF Annotation and Scoring Framework, or simply DCF, 100 in connection with which an embodiment may be employed. As shown, the DCF 100 may include various nodes 102, examples of which may include a gateway 104, an edge server 106, and a cloud site 108, through which data 110 may pass. The data 110 may ultimately be used, or consumed, by an end user 112, such as an application for example.

In an embodiment, the data 110 may be generated by a node such as a sensor, which may comprise an IoT (Internet of Things) edge device for example. Each of the nodes 102 may comprise a respective API 104a, 106a, and 108a, that the nodes 102 may use to communicate confidence information to a DCF SDK (software development kit) 112.

Consider, in the example of FIG. 1, the layers of trust that may be provided in the DCF 100. Particularly, the gateway 104 may have an embedded Intel TPM chip and it may use that chip to perform "trust services" on behalf of the owner of the data 110. In the example above, a "secure boot" annotation, in the trust metadata 105 for the gateway 104, may indicate that the gateway 104 has not been tampered with. The TPM chip may also provide keys used to perform signature services on the data 110. As well, in the example of FIG. 1, the edge server 106 may leverage an ARM secure enclave to perform a "trust service," inspecting the data 110 and performing analytics on it. Finally, a cloud application, such as the Dell Streaming Data Platform running at the cloud site 108, may perform additional trust services on the data 110 such as, for example, inspect the data 110 for drift, as may be done if the data is coming from a sensor with a well-known range of values and/or a long history of stable behavior.

As further indicated in FIG. 1, trust metadata generated at each state of the data 110 journey may be added to trust metadata generated at upstream nodes. Thus, for example, the trust metadata 105 may have been generated at the gateway 104, and the trust metadata 107 may include both the trust metadata 105 and trust metadata generated at the edge server 106. Finally, the trust metadata 109 may include trust metadata generated at the cloud site 108, as well as the trust metadata generated at the edge server 106, and at the gateway 104.

The accumulated trust metadata 109 may be stored in an immutable ledger 111 that may be accessible by the application 112. Additionally, or alternatively, a confidence score 113 may be generated based on the trust metadata 109, and made available to the application 112 or other data 110 end user(s).

The recipient, that is, the data owner, of these trust services that insert trust metadata may require this level of trust insertion in order that their applications, such as the application 112 for example, can produce insights from the data 110 with confidence that the data 110 is trustworthy. The trust insertion functionality may be of great value because it may significantly reduce the risk of dangerous actuation or other business logic resulting from low-quality, erroneous, or malicious data. By identifying compliance levels in an edge environment, trust services may also identify, and significantly reduce, the risk of regulatory compliance violations. Preventing these violations may enable trust service recipients to avoid regulatory fines. One or more embodiments may enable the vendors providing these trust/confidence services to accurately track the provision of these services in a DCF, and an embodiment may also enable the vendor to bill the data owner, and/or other trust service consumers. Details concerning some example functionalities that may be provided by an embodiment are set forth in the following section.

B. Aspects of an Example Architecture and Operations According to One Embodiment

B.1 Overview

One example embodiment comprises a DCF-assisted early warning system that uses data confidence scores to identify potential hardware or software issues in edge devices before they lead to disruptions. By monitoring confidence levels, the system can trigger alerts or initiate fixes when confidence scores deviate from normal patterns.

In more detail, the DCF-enabled edge environment generates and maintains confidence scores for all data streams. The DCF-assisted early warning system monitors data confidence score fluctuations over time, detecting unusual changes that could indicate potential system or device malfunctions. Alerts are triggered, and corrective actions may be initiated if confidence score deviations exceed predefined thresholds, ensuring proactive maintenance of edge devices. Thus, one embodiment comprises a DCF-assisted early warning system that leverages data confidence scores to detect potential hardware or software issues introduces a novel, proactive approach to maintaining edge device stability and performance. By way of contrast, conventional early warning systems do not, for example, generate or consider data confidence scores as indicators for hardware or software issues in edge devices, or systems/equipment monitored by edge devices. The following example use case is illustrative.

Consider a connected factory with numerous edge devices monitoring various production processes and equipment health. An embodiment of the DCF-assisted early warning system identifies unusual fluctuations in data confidence scores, indicating potential problems in the production processes and equipment health. In this way, an embodiment may detect potential issues before they disrupt factory operations or cause significant downtime.

B.2 Discussion of Aspects of One Embodiment

Figure 2:
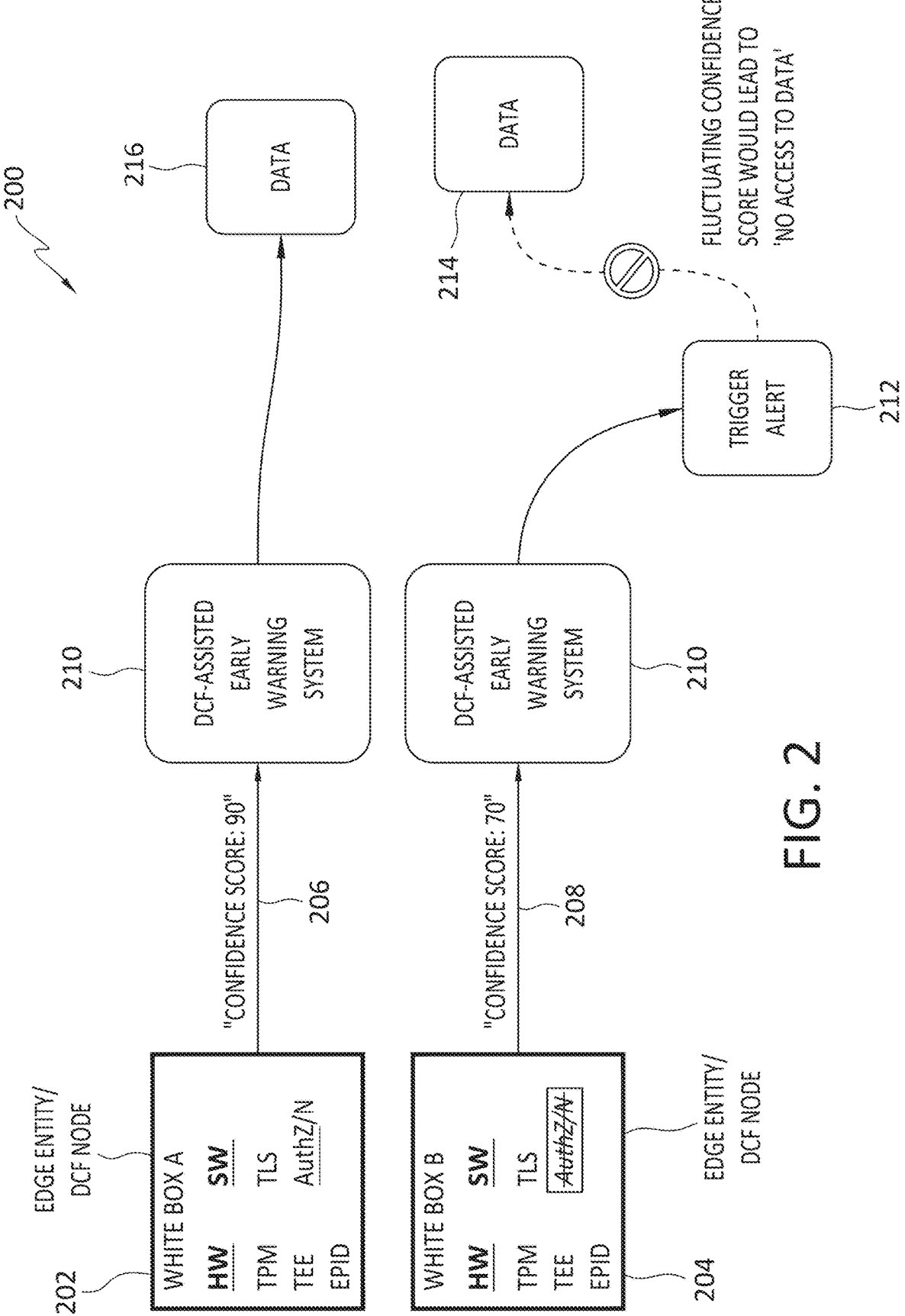
FIG. 2 discloses aspects of an architecture according to one embodiment.

With attention now to FIG. 2, an example architecture, and associated operations, according to one embodiment are disclosed. As shown there, the example architecture 200 may comprise a group of edge devices, such as the edge devices 202 and 204 for example, that are configured to communicate with each other. Each of the edge devices 202 and 204 may comprise a respective node of a DCF, such that data may be passed between the edge devices 202 and 204, and respective confidence scores assigned to the data generated and/or collected by each of the edge devices 202 and 204. In an embodiment, each of the edge devices 202 and 204 assigns respective confidence scores to data that passes through it or is otherwise handled by it, that is, passes through or is otherwise handled by the edge device 202 or 204.

In an embodiment, one or both of the edge devices 202 and 204 may operate to monitor aspects of the operation of various systems and equipment, such as may be found in a warehouse or industrial environment for example. As such, the edge devices 202 and 204 may comprise respective sensors operable to monitor one or more attributes of the performance and operation of such systems and equipment. In an embodiment, example edge devices 202 and 204 may comprise sensors and/or other devices operable to monitor, and collect data concerning, attributes such as, but not limited to, temperature, humidity, particulates, vibration, rpms, engine/motor power output, bandwidth consumed, IOs (input/output operations), network latency, and memory usage/consumption. In an embodiment, the edge devices 202 and 204 may be operable to assign confidence scores to the data that they collect.

In the illustrative example of FIG. 2, the edge device 202 comprises various hardware security measures such as a TEE (trusted execution environment) and a TPM (trusted platform module). By comparison, the edge device 204 does not include any hardware security measures. As such, a confidence score 206 assigned to data coming from the edge device 202 may be higher than a confidence score 208 assigned to data coming from the edge device 204.

In an embodiment, the specific values of confidence scores may be less significant than the changes in those confidence scores. For example, the changes in confidence scores may occur over a long period of time, thus enabling trend analyses, or may occur in a short period of time. An embodiment may consider both the timeframe over which a change in a confidence score occurred, and the magnitude of the change in a confidence score, in determining whether a potential problem is indicated by the edge device.

In an embodiment, the confidence scores 206 and 208, and possibly edge-device unique identifiers, may be provided by the edge devices 202 and 204 to a DCF-assisted early warning system (EWS) 210, or respective instances of a DCF-assisted early warning system (EWS) that may be hosted at the edge devices 202 and 204. The EWS 210, however implemented and hosted, may be configured to receive, possibly as part of a monitoring process, the confidence scores 206/208 from the edge devices 202 and 204, and compare those confidence scores 206/208 to previously obtained confidence scores from the edge devices 202 and 204 to determine, for example [1] whether a change has occurred in a confidence score, [2] when the change occurred, [3] a length of time over which the change occurred, [4] the magnitude of the change, and [5] a stability of the confidence score change. In the example of [5], if the confidence score is erratic or unstable over a period of time, that may be cause to investigate the edge device whose data is associated with that confidence score, even if the changes in the confidence score never exceed an established threshold.

Confidence score histories, and associated confidence score changes, may be stored at the EWS 210 for future reference, as well as for performance of processes such as trend analyses when a change has occurred over a relatively long period of time. In this latter case, the incremental changes, considered on an individual basis, may not necessarily be indicative of a problem, but considered together may indicate a trend toward a potential problem.

With continued reference to the example of FIG. 2, the EWS 210 may take various actions, or no action, following the comparison of a change in confidence score with an established threshold. For example, if a change is determined by the EWS 210 to have occurred in a confidence score provided by the edge entity 204, and that change exceeds a threshold, that determination may, possibly automatically, trigger an alert 212. In embodiment, the alert 212 may be transmitted to an administrator for action, or may automatically cause a change to a data handling policy applicable to the edge entity 204. In the example of FIG. 2, the alert 212 causes a 'no access to data' policy to be applied to the edge device 204 so that the edge device 204 is not permitted to access data 214.

The configuration and performance of the edge device 204 may then be investigated to determine a cause, and possible solution, to the problem(s) implicated or indicated by the change in confidence score. For example, such an investigation may reveal that a malfunctioning TPM (trusted platform module) or TEE (trusted execution environment) has caused the decrease in the confidence score applied by the edge device 204 to its data. Any malfunctioning hardware and/or software of the edge device 204 may then be repaired or replaced, and a check performed to ensure that confidence levels for data coming from the edge device 204 have returned to expected values.

On the other hand, in the example of FIG. 2, the confidence score changes, if any, associated with the data of the edge device 202, have not exceeded the threshold and, accordingly, no change is made to the data 216 access policy for the edge device 202. It is noted that the 'no access to data' is but one example of a policy change that may be made based on a change in a confidence score, and as such is not intended to limit the scope of this disclosure or the claims.

In an embodiment, changes to the confidence scores of a system or device may be monitored, such as by the EWS 210 on an ongoing basis. Additionally, or alternatively, the confidence scores and any associated changes to those scores may be monitored, possibly on request by an administrator or other entity, on an ad hoc basis for a defined period of time.

C. Example Methods

It is noted that any operation(s) of any of the methods disclosed herein, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Figure 3:
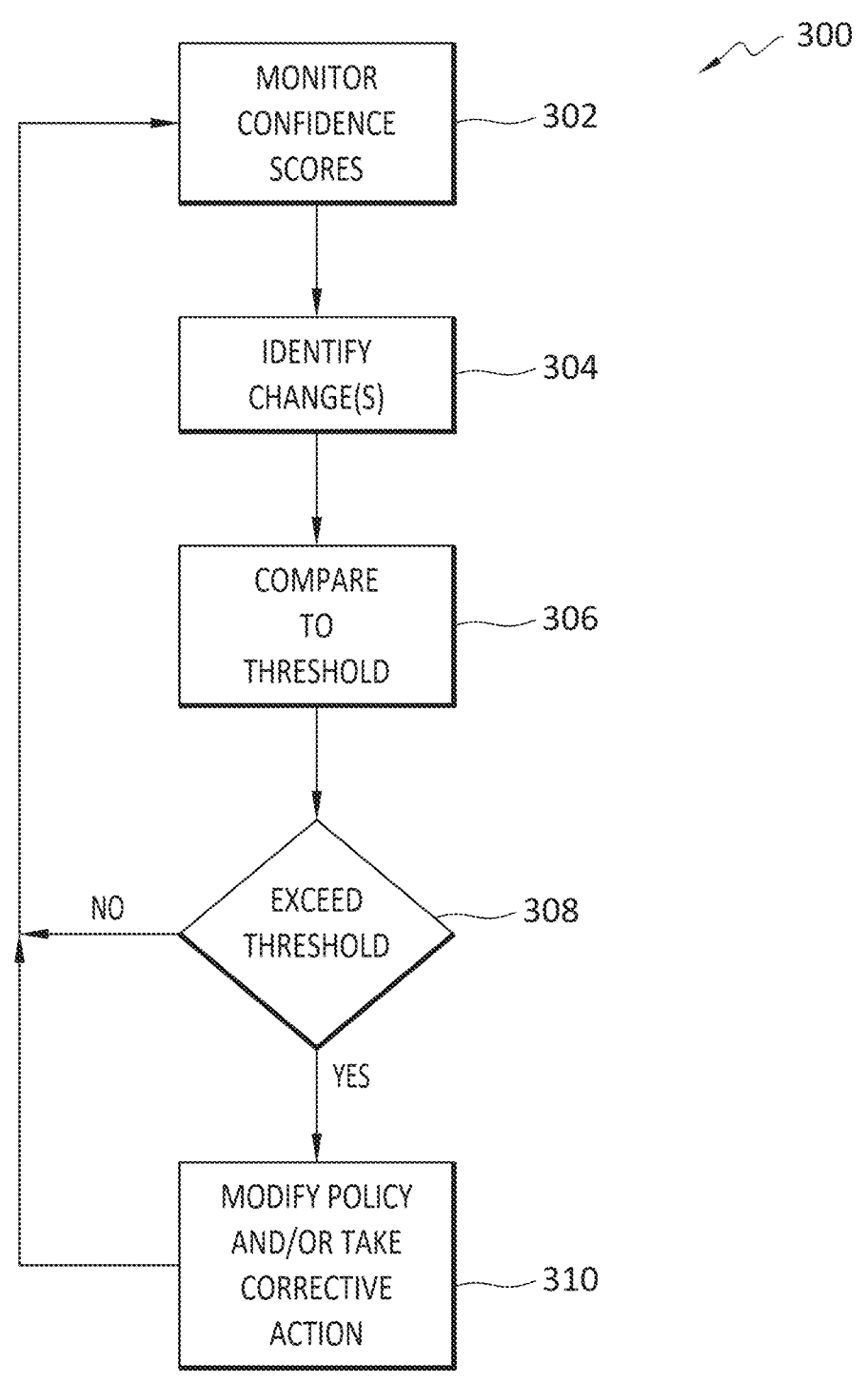
FIG. 3 discloses a method according to one embodiment.

Directing attention now to FIG. 3, a method 300 according to one example embodiment is disclosed. In an embodiment, the method 300 may be performed in whole or in part by an EWS, example embodiments of which are disclosed herein.

The example method 300 may begin with the monitoring 302 of data confidence scores received one or more systems and devices, such as edge devices of an edge environment for example. The data confidence scores for a device may be compared with prior data confidence scores received from that device to identify 304 any changes.

Any confidence score changes that have been identified 304 may then be compared 306 to a threshold confidence score change value. The threshold confidence score may represent a permissible change in a confidence score. For example, if a threshold maximum confidence score change is 10, a change in confidence score from 90 to 70 would exceed the threshold maximum confidence score change.

Thus, as a result of the comparison 306, a determination 308 may then be made as to whether the magnitude of the confidence score change exceeds the threshold maximum confidence score change. If not, the method 300 may return to 302. If the magnitude of the confidence score change exceeds the threshold maximum confidence score change, a policy, such as a data handling policy for example, associated with the device whose data is associated with the confidence score change may be modified 310. Additionally, or alternatively, a corrective action may be taken with respect to the device whose data is associated with the confidence score change.

In one embodiment, a confidence score change may concern data gathered by an edge device concerning hardware and/or software monitored by that edge device. In this case, the action taken at 310 may comprise repairing or replacing that hardware and/or software.

D. Further Example Embodiments

Following are some further example embodiments. These are presented only by way of example and are not intended to limit the scope of this disclosure or the claims in any way.

Embodiment 1. A method, comprising: monitoring confidence scores received from an edge entity in an edge environment, and the edge entity comprises hardware and/or software; comparing a change in the confidence scores with a threshold permissible confidence score change; when a magnitude of the change is above a threshold permissible change, identifying the edge entity, or a system/device monitored by the edge entity, as a possibly malfunctioning entity; identifying a corrective action for the edge entity; and implementing, and/or causing implementation of, the corrective action.

Embodiment 2. The method as recited in any preceding embodiment, wherein the confidence scores are associated with a data stream provided by the edge entity.

Embodiment 3. The method as recited in any preceding embodiment, wherein the corrective action comprises changing a data handling policy applicable to the edge entity and/or to the system/device monitored by the edge entity.

Embodiment 4. The method as recited in any preceding embodiment, wherein the corrective action comprises changing an aspect of the system/device monitored by the edge entity.

Embodiment 5. The method as recited in any preceding embodiment, wherein when the magnitude of the change is above a threshold permissible change, identifying the edge entity, or a system/device monitored by the edge entity, an alert is automatically triggered.

Embodiment 6. The method as recited in embodiment 5, wherein the alert automatically triggers identification and implementation of the corrective action.

Embodiment 7. The method as recited in any preceding embodiment, wherein the change in the confidence score occurs over a period of time, or instantaneously.

Embodiment 8. The method as recited in any preceding embodiment, wherein a trend analysis is performed regarding the confidence scores, and an outcome of the trend analysis is used to identify the corrective action.

Embodiment 9. The method as recited in any preceding embodiment, wherein new confidence scores obtained after implementation of the corrective action are checked against the threshold permissible change.

Embodiment 10. The method as recited in any preceding embodiment, wherein the corrective action is implemented. prior to any malfunction of the edge entity.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 4:
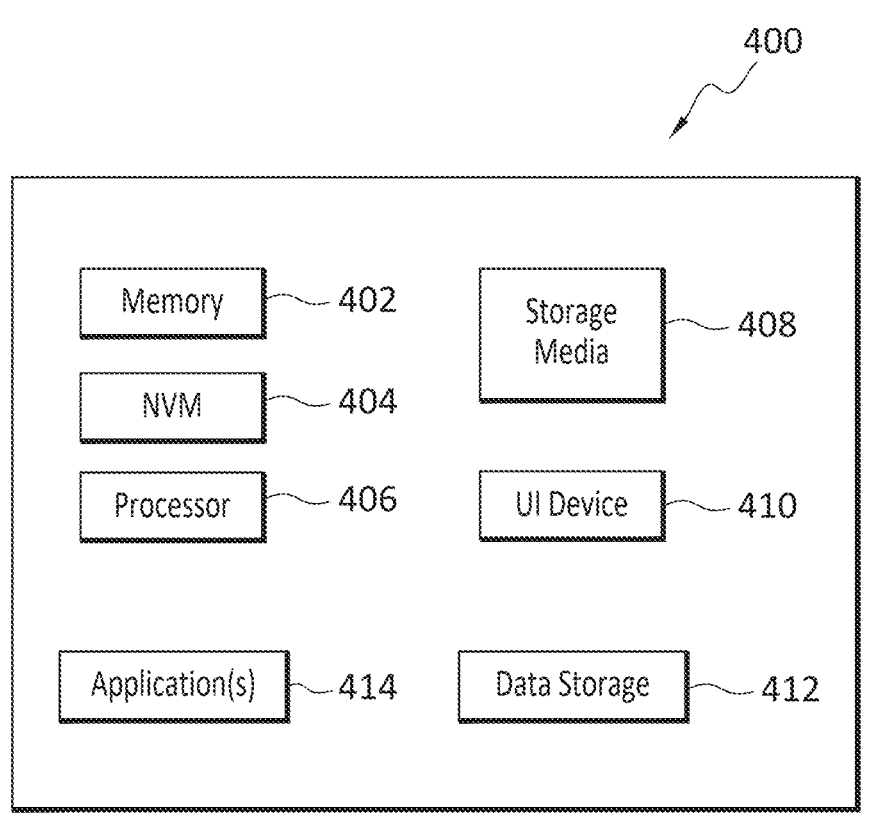
FIG. 4 discloses a computing entity configured and operable to perform any of the disclosed methods, processes, and operations.

With reference briefly now to FIG. 4, any one or more of the entities disclosed, or implied, by FIGS. 1-3, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method for detecting and resolving hardware and/or software failures in an edge device, comprising:

using an edge entity, that comprises hardware and/or software, to monitor aspects of physical attributes of an operating environment and/or aspects of operations performed by physical systems in the operating environment;

monitoring confidence scores received from the edge entity concerning data collected by the edge entity regarding the aspects of the physical attributes of an operating environment and/or the aspects of the operations performed by the physical systems in the operating environment, the confidence scores having been generated by the edge entity based at least in part on a hardware and/or software configuration of the edge entity;

comparing a change in the confidence scores with a threshold permissible confidence score change;

when a magnitude of the change is above a threshold permissible change, identifying the edge entity, or a system/device monitored by the edge entity, as a possibly malfunctioning entity;

identifying a corrective action for the edge entity; and implementing, and/or causing implementation of, the corrective action, and the corrective action comprises repairing or replacing the hardware and/or software of the edge entity.

2. The method as recited in claim 1, wherein the confidence scores are associated with a data stream provided by the edge entity.

3. The method as recited in claim 1, wherein the corrective action further comprises changing a data handling policy applicable to the edge entity and/or to the system/device monitored by the edge entity.

4. The method as recited in claim 1, wherein when the magnitude of the change is above a threshold permissible change, identifying the edge entity, or a system/device monitored by the edge entity, an alert is automatically triggered.

5. The method as recited in claim 4, wherein the alert automatically triggers identification and implementation of the corrective action.

6. The method as recited in claim 1, wherein the change in the confidence score occurs over a period of time, or instantaneously.

7. The method as recited in claim 1, wherein a trend analysis is performed regarding the confidence scores, and an outcome of the trend analysis is used to identify the corrective action.

8. The method as recited in claim 1, wherein new confidence scores obtained after implementation of the corrective action are checked against the threshold permissible change.

9. The method as recited in claim 1, wherein the corrective action is implemented prior to any malfunction of the edge entity.

10. A non-transitory storage medium having stored therein instructions that are executable by one or more hardware processors to perform:

a method for detecting and resolving hardware and/or software failures in an edge device, the method comprising operations including:

using an edge entity, that comprises hardware and/or software, to monitor aspects of physical attributes of an operating environment and/or aspects of operations performed by physical systems in the operating environment;

monitoring confidence scores received from the edge entity concerning data collected by the edge entity regarding the aspects of the physical attributes of an operating environment and/or the aspects of the operations performed by the physical systems in the operating environment, the confidence scores having been generated by the edge entity based at least in part on a hardware and/or software configuration of the edge entity;

comparing a change in the confidence scores with a threshold permissible confidence score change;

when a magnitude of the change is above a threshold permissible change, identifying the edge entity, or a system/device monitored by the edge entity, as a possibly malfunctioning entity;

identifying a corrective action for the edge entity; and implementing, and/or causing implementation of, the corrective action, and the corrective action comprises repairing or replacing the hardware and/or software of the edge entity.

11. The non-transitory storage medium as recited in claim 10, wherein the confidence scores are associated with a data stream provided by the edge entity.

12. The non-transitory storage medium as recited in claim 10, wherein the corrective action further comprises changing a data handling policy applicable to the edge entity and/or to the system/device monitored by the edge entity.

13. The non-transitory storage medium as recited in claim 10, wherein when the magnitude of the change is above a threshold permissible change, identifying the edge entity, or a system/device monitored by the edge entity, an alert is automatically triggered.

14. The non-transitory storage medium as recited in claim 13, wherein the alert automatically triggers identification and implementation of the corrective action.

15. The non-transitory storage medium as recited in claim 10, wherein the change in the confidence score occurs over a period of time, or instantaneously.

16. The non-transitory storage medium as recited in claim 10, wherein a trend analysis is performed regarding the confidence scores, and an outcome of the trend analysis is used to identify the corrective action.

17. The non-transitory storage medium as recited in claim 10, wherein new confidence scores obtained after implementation of the corrective action are checked against the threshold permissible change.

18. The non-transitory storage medium as recited in claim 10, wherein the corrective action is implemented prior to any malfunction of the edge entity.

\* \* \* \* \*